US009243548B2

(12) United States Patent
Klingbeil et al.

(10) Patent No.: US 9,243,548 B2
(45) Date of Patent: Jan. 26, 2016

(54) TURBOCHARGED POWER UNIT AND METHOD OF OPERATING UNDER HIGH LOAD CONDITIONS

(75) Inventors: Adam Edgar Klingbeil, Ballston Lake, NY (US); Thomas Michael Lavertu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 589 days.

(21) Appl. No.: 13/457,768

(22) Filed: Apr. 27, 2012

(65) Prior Publication Data

US 2013/0283781 A1  Oct. 31, 2013

(51) Int. Cl.
 *F02B 33/44* (2006.01)
 *F02B 29/04* (2006.01)
 *F02M 25/07* (2006.01)
 *F02B 43/08* (2006.01)
 *F02B 43/00* (2006.01)
 *F02D 23/00* (2006.01)

(52) U.S. Cl.
 CPC ............ *F02B 29/0481* (2013.01); *F02D 23/00* (2013.01); *Y02T 10/146* (2013.01)

(58) Field of Classification Search
 CPC . F02D 23/00; F02D 41/0007; F02B 29/0412; F02B 29/0481; F02B 3/06; F02B 37/10; F02B 37/16; F02B 39/02; F02B 39/10; F02B 29/0475; F02B 29/0425; F02B 2029/0487; F05B 2220/40; Y02T 10/144
 USPC ................ 60/611–612, 599, 605.1, 607–608; 701/103
 See application file for complete search history.

(56) References Cited

U.S. PATENT DOCUMENTS

| 3,289,436 | A | * | 12/1966 | Groves | .................. B64D 13/04 62/402 |
| 3,355,877 | A | * | 12/1967 | Chaffiotte | ........................ 60/599 |
| 4,010,613 | A | * | 3/1977 | McInerney | ....................... 60/599 |
| 5,458,095 | A | * | 10/1995 | Post et al. | .......................... 123/3 |
| 5,577,385 | A | * | 11/1996 | Kapich | ............................ 60/612 |
| 6,158,217 | A |  | 12/2000 | Wang | |
| 6,273,076 | B1 |  | 8/2001 | Beck et al. | |
| 7,100,582 | B1 | * | 9/2006 | Bach | .............................. 123/529 |

(Continued)

FOREIGN PATENT DOCUMENTS

| CN | 101349191 A | * | 1/2009 | ............ Y02T 10/146 |
| DE | 102008027883 A1 | * | 12/2009 | ............. F02M 25/07 |

(Continued)

OTHER PUBLICATIONS

Fully certified English Translation of the reference to Tosa Youzou et al. (Pub. No. JP 06-323143 A), published on Nov. 22, 1994.*

(Continued)

*Primary Examiner* — Thai Ba Trieu
(74) *Attorney, Agent, or Firm* — Joseph J. Christian (57) ABSTRACT

A first stage turbocharger configured to receive an ambient intake air stream. A compressor of the first stage turbocharger coupled to a first intercooler. The first intercooler coupled to a turboexpander stage. The turbine of the turboexpander discharging an expanded air stream to an intake manifold of an engine. The expanded airstream having a temperature of less than the ambient intake air stream, thereby reducing enabling operation of the engine under high load conditions while maintaining reduced emissions.

15 Claims, 8 Drawing Sheets

(56) References Cited

U.S. PATENT DOCUMENTS

| | | |
|---|---|---|
| 7,487,750 B2 | 2/2009 | Leone et al. |
| 7,779,821 B2 | 8/2010 | Noyama et al. |
| 7,980,220 B2 | 7/2011 | Boyer et al. |
| 2004/0035395 A1* | 2/2004 | Heywood et al. ............. 123/435 |
| 2005/0092286 A1 | 5/2005 | Sasaki et al. |
| 2005/0279093 A1 | 12/2005 | Wang et al. |
| 2010/0174470 A1* | 7/2010 | Bromberg et al. ................ 123/3 |
| 2010/0206249 A1* | 8/2010 | Bromberg et al. ................ 123/3 |
| 2011/0094212 A1* | 4/2011 | Ast et al. ......................... 60/327 |
| 2011/0301826 A1* | 12/2011 | Galindo et al. ............... 701/103 |
| 2012/0097117 A1* | 4/2012 | Morgenstern et al. ............ 123/3 |
| 2012/0210952 A1* | 8/2012 | Reuss et al. ............. F02B 7/00 123/559.1 |

FOREIGN PATENT DOCUMENTS

| | | | | |
|---|---|---|---|---|
| EP | 655550 A1 | * | 5/1995 | ............. F02B 29/04 |
| FR | 2852356 A1 | * | 9/2004 | ............. F02B 37/04 |
| GB | 622077 A | * | 4/1949 | ......... F02B 29/0437 |
| GB | 994816 A | | 6/1965 | |
| JP | 6323143 A | | 11/1994 | |
| JP | 2759374 B2 | * | 5/1998 | ............. F02M 25/07 |
| JP | 2004011562 A | * | 1/2004 | ............. F02M 25/07 |
| WO | WO 2009050534 A1 | * | 4/2009 | ............. F02M 25/07 |

OTHER PUBLICATIONS

Whenlan et al., "Turbo-Cooling Applied to Light Duty Vehicle Engines", PTNSS Congress, pp. 1-13, 2005.

* cited by examiner

TURBOCHARGED POWER UNIT AND METHOD OF OPERATING UNDER HIGH LOAD CONDITIONS

BACKGROUND

The disclosure relates generally to engines, and more specifically to a method of operating an engine to increase the range of speeds and loads under which the engine can operate.

Compression-ignition engines, such as diesel engines, operate by directly injecting a fuel (e.g., diesel fuel) into compressed air in one or more piston-cylinder assemblies, such that the heat of the compressed air ignites the fuel-air mixture. The direct fuel injection atomizes the fuel into droplets, which evaporate and mixes with the compressed air. Compression-ignition engines may also be configured to operate under a premixed combustion operation or partially premixed combustion operation. Typically, compression-ignition engines operate at a relatively higher compression ratio than spark ignition engines. The compression ratio directly affects the engine performance, efficiency, exhaust pollutants, and other engine characteristics. In addition, the fuel-air ratio affects engine performance, efficiency, exhaust pollutants, and other engine characteristics. Exhaust emissions generally include pollutants such as carbon oxides (e.g., carbon monoxide), nitrogen oxides (NOx), sulfur oxides (SOx), and particulate matter (PM). In a compression-ignition engine, the amount and relative proportion of these pollutants varies according to the fuel-air mixture, compression ratio, injection timing, environmental conditions (e.g., atmospheric pressure, temperature, etc.), and so forth.

A dual-fuel engine is an alternative type of internal combustion engine designed to run on more than one fuel, for example, natural gas and diesel, each stored in separate vessels. Dual fuel engines typically operate at much lower combustion temperatures because of improved combustion control and reduce tendency to knock. Furthermore, dual fuel engines result in less energy loss from the engine through heat transfer than found in a typical engine. More particularly, such engines are capable of burning varying proportions of the resulting blend of fuels in the combustion chamber and the fuel injection or spark timing may be adjusted according to the blend of fuels in the combustion chamber to result in premixed combustion. In addition, customization of the fuel blend with respect to fuel chemistry provides for optimal combustion and results in less unburned fuel energy lost in the exhaust and fewer pollutant emissions during the combustion process. For dual fuel operation where one of the fuels is premixed with air, a reduction in nitrogen oxide (NOx) and particulate matter (PM) emissions is enabled by combusting a relatively larger fraction of the premixed fuel.

Premixed combustion strategies, such as those previously described, are of interest in internal combustion engines due to the significant reduction in NOx and PM emissions while often times enabling improvements in efficiency. However, one challenge that plagues these types of engines is operation at high loads. For premixed combustion, the fuel-air mixture needs to be supplied at approximately the same stoichiometry, regardless of the load. That means that for constant intake temperature, as the load increases, the peak cylinder pressures increase. However, when the engine is operated at high load, uncontrolled auto-ignition of the premixed fuel can become a problem and peak cylinder pressures become very high, limiting premixed combustion strategies to lower loads only.

Accordingly, there is a need for an improved system and method for engines operating under a premixed combustion configuration that permits engine operation at increased speeds and under higher load conditions without causing auto-ignition and reaching peak firing pressure limits.

BRIEF DESCRIPTION

In accordance with an embodiment, a turbocharged power unit is provided. The turbocharged power unit includes a first stage turbocharger, an intercooler, a turboexpander stage and an engine. The first stage turbocharger includes a turbine coupled via a turbocharger shaft to a compressor. The compressor is configured to receive an ambient intake air stream and discharge a compressed air stream. The intercooler is coupled to an output of the compressor of the first stage turbocharger and configured to receive the compressed air stream from the compressor of the first stage turbocharger and discharge a cooled compressed air stream. The turboexpander stage includes a turbine in fluidic communication with the cooled compressed air stream from the intercooler and is configured to discharge an expanded air stream. The engine includes an intake manifold coupled to the turbine of the turboexpander stage to receive therefrom the expanded air stream. The turbine of the turboexpander stage is configured to provide an expansion of the cooled compressed air stream to form the expanded air stream having a temperature of less than the ambient intake air stream.

In accordance with another embodiment, a turbocharged power unit is provided. The turbocharged power unit includes a first stage turbocharger, a first intercooler, a second stage turbocharger, a second intercooler and an engine. The first stage turbocharger includes a turbine coupled via a turbocharger shaft to a compressor. The compressor is configured to receive an ambient intake air stream and discharge a compressed air stream. The first intercooler is coupled to an output of the compressor of the first stage turbocharger. The first intercooler is configured to receive the compressed air stream from the compressor of the first stage turbocharger and discharge a cooled compressed air stream. The second stage turbocharger includes a turbine coupled via a turbocharger shaft to a compressor. The compressor is coupled to an output of the first intercooler and configured to receive the cooled compressed air stream from the first intercooler and discharge a compressed air stream. The second intercooler is coupled to an output of the compressor of the second stage turbocharger. The second intercooler is configured to receive the compressed air stream from the compressor of the second stage turbocharger and discharge a cooled compressed air stream to the turbine of the second stage turbocharger. The engine includes an intake manifold coupled to the turbine of the second stage turbocharger to receive therefrom an expanded air stream. The turbine of the second stage turbocharger is configured to provide an expansion of the input compressed air stream discharged from the second intercooler to form the expanded air stream having a temperature of less than the ambient intake air stream.

In accordance with another embodiment, a method is disclosed. The method includes providing a first stage turbocharger, compressing an ambient intake air stream in the compressor of the first stage turbocharger to discharge a compressed air stream, cooling the compressed air stream in an intercooler coupled to the compressor of the first stage turbocharger to discharge a cooled compressed air stream, expanding the cooled compressed air stream in a turbine of a turboexpander stage to discharge an expanded air stream, providing the expanded air stream to an intake manifold of an engine, mixing a fuel with the expanded air stream in a combustion chamber in fluidic communication with the intake manifold, and combusting the fuel. The first stage turbocharger includes a turbine and a compressor. The turbine is configured to receive an exhaust from an exhaust manifold of an engine and provide extracted energy via a turbocharger shaft to a compressor. The expanded air stream is cooled in the turbine of the turboexpander stage to a temperature of less than the ambient intake air stream.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE FIGURES

The above and other features, aspects, and advantages of the present disclosure will become better understood when the following detailed description is read with reference to the accompanying drawing in which like characters represent like parts throughout the drawing, wherein.

DETAILED DESCRIPTION

In accordance with the embodiments of the present invention, an engine utilizing a turborefrigeration in conjunction with premixed combustion strategies is disclosed. The exemplary power unit includes at least one compression stage, with intercooling provided after each compression stage, an expander following the intercooling and an engine including an intake manifold and an exhaust manifold. The expander is configured with the capability to cool the engine intake air to below ambient temperature, thus enabling the air to be supplied to the engine at lower initial temperatures, and allowing the engine to be operated at higher loads under a premixed configuration. In accordance with the disclosed embodiment of the invention, a method associated with the exemplary power unit is disclosed. The embodiment of the present invention enables the use of turborefrigeration, without the use of a refrigerant, in conjunction with premixed combustion strategies to increase the range of speeds and loads under which an engine can be operated in a premixed mode while simultaneously controlling emissions such as nitrogen oxides ($NO_x$), particulate matter (PM), carbon monoxide (CO), and unburnt hydrocarbons (HC).

Figure 1:
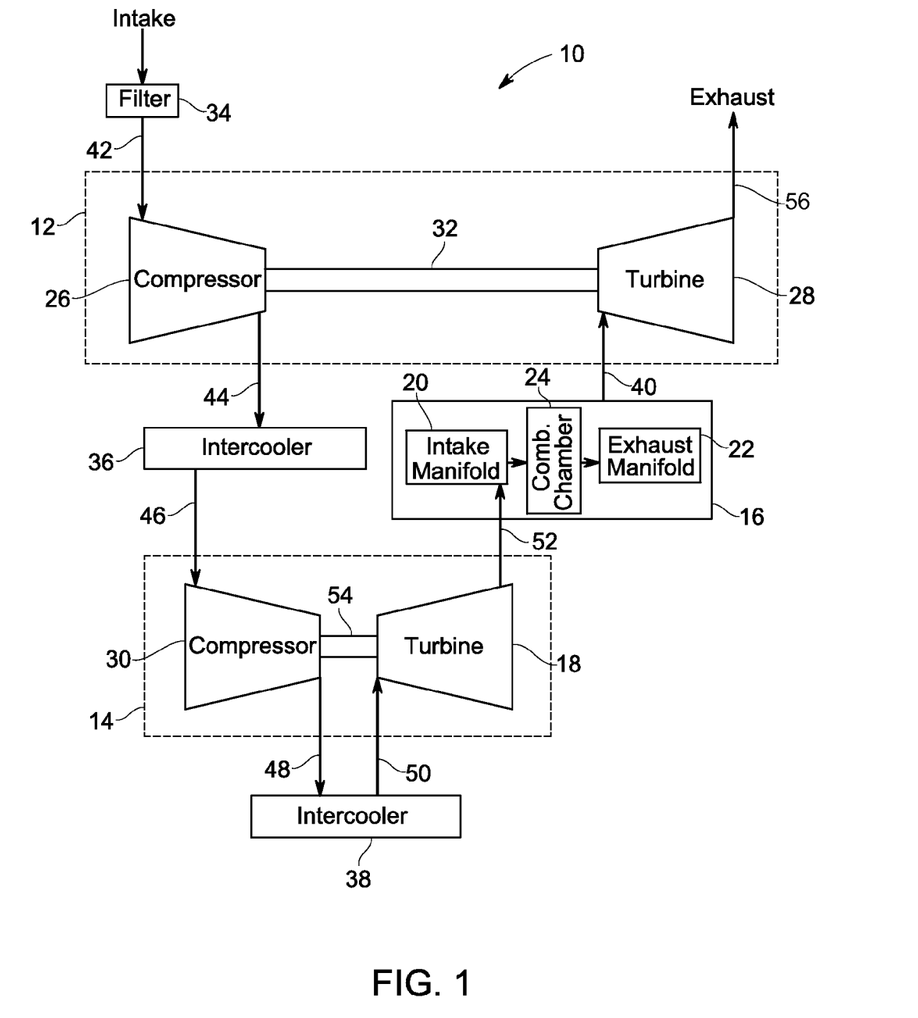
FIG. 1 is a diagrammatical representation of a power unit having an engine configured to include turbo-refrigeration for operation under high load conditions in accordance with an exemplary embodiment.

Referring to FIG. 1, a turbocharged power unit 10 is illustrated in accordance with an embodiment of the present disclosure. The power unit 10 utilizes two-stage turbo-charging and includes a first stage turbo-charger 12, a second stage turbo-charger 14, an engine 16 and an expander 18. The first stage turbo-charger 12 and the second stage turbo-charger 14 are configured to operate independently without the need for a means for coupling therebetween. In accordance with an embodiment, the engine 16 is a dual fuel engine. A motor-generator unit (not shown) may be mechanically coupled to the first stage turbocharger 12. As discussed in further detail below, an embodiment of the present disclosure provides an increase in the range of speeds and loads under which an engine can be operated in a premixed mode. In addition, an embodiment of the present disclosure provides emission control features for the engine 16. It should be noted herein that although the turbocharged power unit 10 is disclosed, the use of turborefrigeration in conjunction with premixed combustion strategies is also applicable for other applications requiring engine power. Similarly, aspects of the present disclosure are suitable for any engine requiring operation at higher loads under premixed conditions.

The engine 16 of the illustrated turbocharged power unit 10 includes an air intake manifold 20, an exhaust manifold 22 and a combustion chamber 24. The first stage turbo-charger 12 includes a compressor 26 and a turbine 28. The second stage turbo-charger 14 includes a second compressor 30 and the turbine 18 in fluidic communication with the first stage turbo-charger 12 and the engine 16. For ease in interpretation, the compressor 26 of the first stage turbo-charger 12 may also be referred to herein as the "first compressor 26". Likewise, the compressor 30 of the second stage turbo-charger 14 may also be referred to herein as the "second compressor 30". The first stage turbo-charger 12 and the second stage turbo-charger 14 are operated to supply compressed air to the air intake manifold 20 for combustion within the engine 16. In the illustrated embodiment, the demands placed on the first stage turbocharger 12 and the second stage turbocharger 14 vary considerably from each other. In an embodiment, the second stage turbocharger 14 functions as a high-pressure stage and is charged by the full exhaust from turbine 28, however it only receives a lesser air volume (of previously compressed air) from the first stage turbo-charger 12 or low-pressure stage. Accordingly, the second stage turbocharger 14 may employ a smaller compressor as compressor 30, than the first stage turbocharger 12 and first compressor 26. The first stage turbocharger 12 may be similar to those typical of a single-stage turbocharger.

As illustrated in FIG. 1, the turbine 28 is coupled to the exhaust manifold 22 of engine 16 for extracting energy from exhaust gases 40 utilized for rotating a turbocharger shaft 32 coupled to the compressor 26. The compressor 26 draws in an ambient intake air stream 42 through an optional filter 34 into compressor 26. After passing through the first compressor 26, the intake ambient air stream 40, is discharged as a compressed air stream 44 at a relatively higher pressure and higher temperature. The compressed air stream 44 is next passed through the first intercooler 36. The temperature and pressure of the ambient intake air stream 42 is increased due to compression in the compressor 26. The compressed air stream 44 flows through the first intercooler 36 such that the temperature of the compressed air stream 44 is reduced prior to delivery of a cooled compressed air stream 46 into the second stage turbo-charger 14, and more specifically the second compressor 30. The second compressor 30 provides a further compressed air stream 48 to a second intercooler 38. The compressed air stream 48 flows through the second intercooler 38 such that the temperature of the compressed air stream 48 is reduced prior to delivery of a cooled compressed air stream 50 into the turbine 18 coupled to the intake manifold 20 of the engine 16. In an embodiment, the first and second intercoolers 36, 38 function as heat exchangers, and more particularly as air-to-water heat exchangers, which utilize a coolant to facilitate removal of heat from the compressed air 44, 48. In another embodiment, the first and second intercoolers 36, 38 function as heat exchangers, and more particularly as air-to-air heat exchangers, which utilize ambient air to facilitate removal of heat from compressed air 44, 48. In yet another embodiment, the first and second intercoolers 36, 38 may include any combination of air-to-water heat exchangers or air-to-air heat exchangers either individually or in series.

In the illustrated embodiment, the turbine 18 expands the cooled compressed air stream 50 to a lower pressure and temperature and, thus, provides turbo-refrigeration that in conjunction with premixed combustion strategies enables engine 16 to operate at increased range of speeds and loads. The turbine 18 extracts energy from the cooled compressed air stream 50 and utilizes it for rotating a turbocharger shaft 54 coupled to the second compressor 30. The turbine 18 may be an axial type expander, an impulse type expander, a high temperature screw type expander or a radial-inflow turbine type of expander. After passing through the turbine 18, the cooled compressed air stream 50, discharged at a relatively lower pressure and temperature less than the ambient air intake stream 42 temperature, is passed through the intake manifold 20 of the engine 16. Expanding the cooled compressed air stream 50 from the second intercooler 38 in the turbine 18 prior to input into the engine 16 provides for a cooled, high pressure air 52 to enter a combustion chamber 38 of the engine 16 at a temperature that is below ambient temperature, but at a high pressure. By using turborefrigeration, the ambient intake air 42 is cooled to below ambient temperatures and the difference in temperature, relative to ambient, increases as the pressure ratio increase. For turbocharged engines, pressure ratios increase as load increases. Hence, at high loads, the manifold temperatures are colder than at low loads. The end result is that more air can be supplied to the engine 16 without causing uncontrolled autoignition of the premixed fuel or reaching peak firing pressure limits, and the engine 16 can be operated at higher loads under a premixed configuration.

In one exemplary embodiment, during operation of power unit 10, the intake ambient air stream 42 is at a pressure of ~1 atm and temperature of approximately ~300 K. After passing through the first compressor 26 the compressed air stream 42 is supplied to the intercooler 26 at a pressure of ~4 atm and temperature of approximately ~500 K. The cooled compressed air stream 44 is discharged from the first intercooler 26, as cooled compressed air stream 46 at a pressure of ~4 atm and temperature of approximately ~320 K. The cooled compressed air stream 46 next enters the second compressor 30 and is supplied to the second intercooler 38 at a pressure of ~5.8 atm and temperature of approximately ~375 K. The compressed air stream 48 is discharged from the second intercooler 38, as cooled compressed air stream 50 at a pressure of ~5.8 atm and temperature of approximately ~320 K. The cooled compressed air stream 50 is next expanded in turbine 18 whereupon it is provided as expanded air stream 52 for intake at the intake manifold 20 of engine 16 at a pressure of ~3.6 atm and temperature of approximately ~270 K. The temperature of the expanded air stream 52 entering the engine 16 is lower than the atmospheric or ambient temperature, which enables operation under high load conditions while maintaining control of emissions. The exhaust air stream 40 exits the engine 16 through the exhaust manifold 22 and is supplied to the turbine 28 at a pressure of ~3.5 atm and temperature of approximately ~750 K. An exhaust air stream 56, upon exiting the turbine 18 is at a pressure of ~1.0 atm.

As discussed above, the engine 16 may utilize a plurality of fuels for operating the engine 16. In a preferred embodiment, a first fuel source (not shown) is coupled to the intake manifold 20 for feeding a first fuel, for example a gaseous fuel, via the intake manifold 20 to the combustion chamber 24. The gaseous fuel may include but is not limited to one or a combination of natural gas, nitrogen, hydrogen, syngas, gasoline, ethanol, carbon monoxide, and propane. A second fuel source (not shown) is coupled to the intake manifold 20, or the combustion chamber 24, for feeding a second fuel, for example diesel, via the intake manifold 20 to the combustion chamber 24. The second fuel may also include other type of fuels.

In one embodiment, a mixture of air and the first fuel are fed via the intake manifold 20 to the combustion chamber 24, and the second fuel is injected directly into the combustion chamber 24. In another embodiment, a mixture of air, the first fuel, and the second fuel are fed via the intake manifold 20 to the combustion chamber 24. The air, the first fuel, and the second fuel are combusted within the combustion chamber 24. All such permutations and combinations of feeding the air, the first fuel, and the second fuel to the combustion chamber 24 are envisaged. The air, the first fuel and the second fuel are combusted within the combustion chamber 24.

As discussed above, one advantage of using dual fuels instead of a single fuel is that dual fuels, when subjected to combustion, can generate less emissions such as nitrogen oxide ($NO_x$), and particulate matter, when at least one of the fuels is premixed with the air prior to combustion. Subsequent to combustion, the exhaust emissions from the combustion chamber 24 are fed via the exhaust manifold 22 to the turbine 28.

The power unit 10 may also include a control unit (not shown). In one embodiment, the control unit is an electronic fuel injection control unit for the engine 16. In another embodiment, the control unit is an electronic logic controller that is programmable by a user. The control unit may be operable to control operation of a plurality of fuel injectors of engine 16 for injecting the first and second fuel into the combustion chamber of the engine 16 so as to optimize the combustion. In some embodiments, the control unit may control the plurality of fuel injectors based on an output from a plurality of sensors (not shown). The plurality of sensors may include but is not limited to an emission sensor, fuel injection timing sensor, a throttle position sensor, manifold air pressure sensor, manifold air temperature sensor, exhaust gas temperature sensor, turbocharger speed sensor, engine power sensor, fuel-air ratio sensor or the like.

Figure 2:
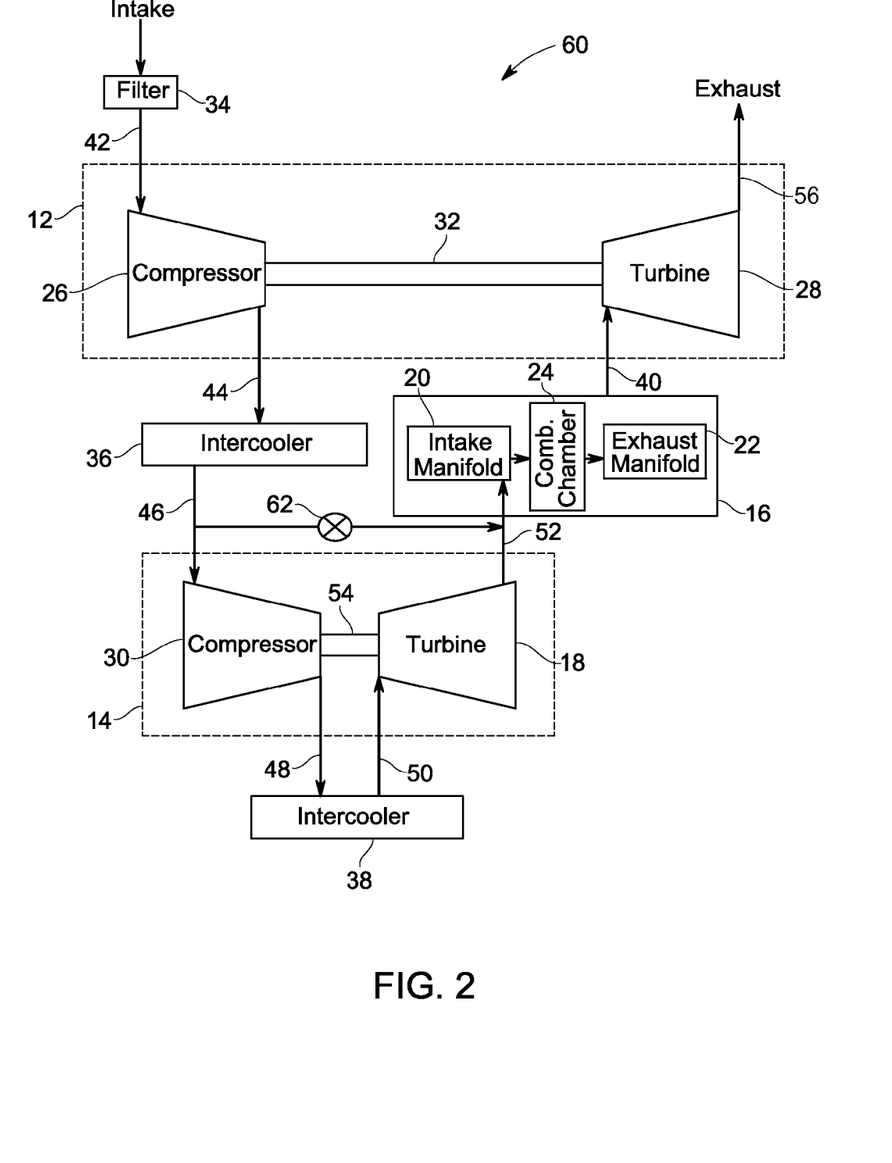
FIG. 2 is a diagrammatical representation of a power unit having an engine configured to include turbo-refrigeration for operation under high load conditions in accordance with an exemplary embodiment.

Referring now to FIGS. 2-7, illustrated are various alternative embodiments of a power unit and method of operating an engine under increased load conditions. Referring more specifically to FIG. 2, illustrated is an embodiment of a power unit 60, generally similar to power unit 10 of FIG. 1. In this particular embodiment, the power unit 60 further includes a bypass valve 62 for variable air flow/MAT. The bypass valve 62 is configured as an air flow bypass and in fluidic communication with the cooled compressed air stream 46 and the expanded air stream 52. The inclusion of the bypass valve 62 enables the control of any surge of the first stage turbocharger 12. During operation of power unit 60, the bypass valve 62 may be opened to increase air flow during transient acceleration. In an embodiment, the valve 62 may be configured as a three-way valve to allow for control to the desired bypass.

Figure 3:
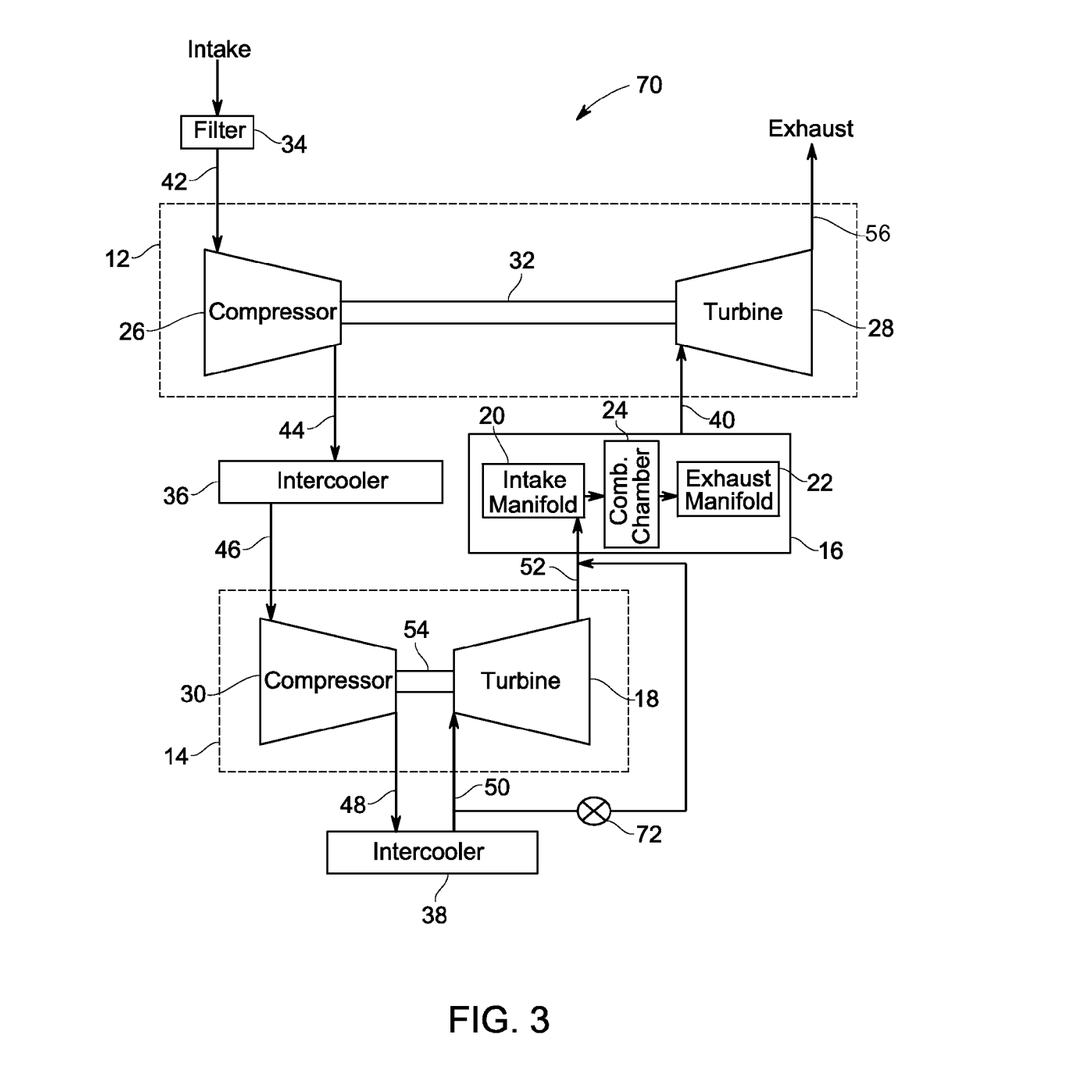
FIG. 3 is a diagrammatical representation of a power unit having an engine configured to include turbo-refrigeration for operation under high load conditions in accordance with an exemplary embodiment.

Referring now to FIG. 3, illustrated is an embodiment of a power unit 70, generally similar to power unit 60 of FIG. 2, wherein a bypass valve 72 for variable air flow/MAT is configured as an air flow bypass and in fluidic communication with the cooled compressed air stream 50 and the expanded air stream 52. The inclusion of the bypass valve 72 enables the control of any surge of first stage turbocharger 12. During operation of power unit 70, the bypass valve 72 may be opened to increase air flow during transient acceleration. Similar to the previous embodiment, in an embodiment, the valve 72 may be configured as a three-way valve to allow for improved control around the turbine and to the desired bypass.

Figure 4:
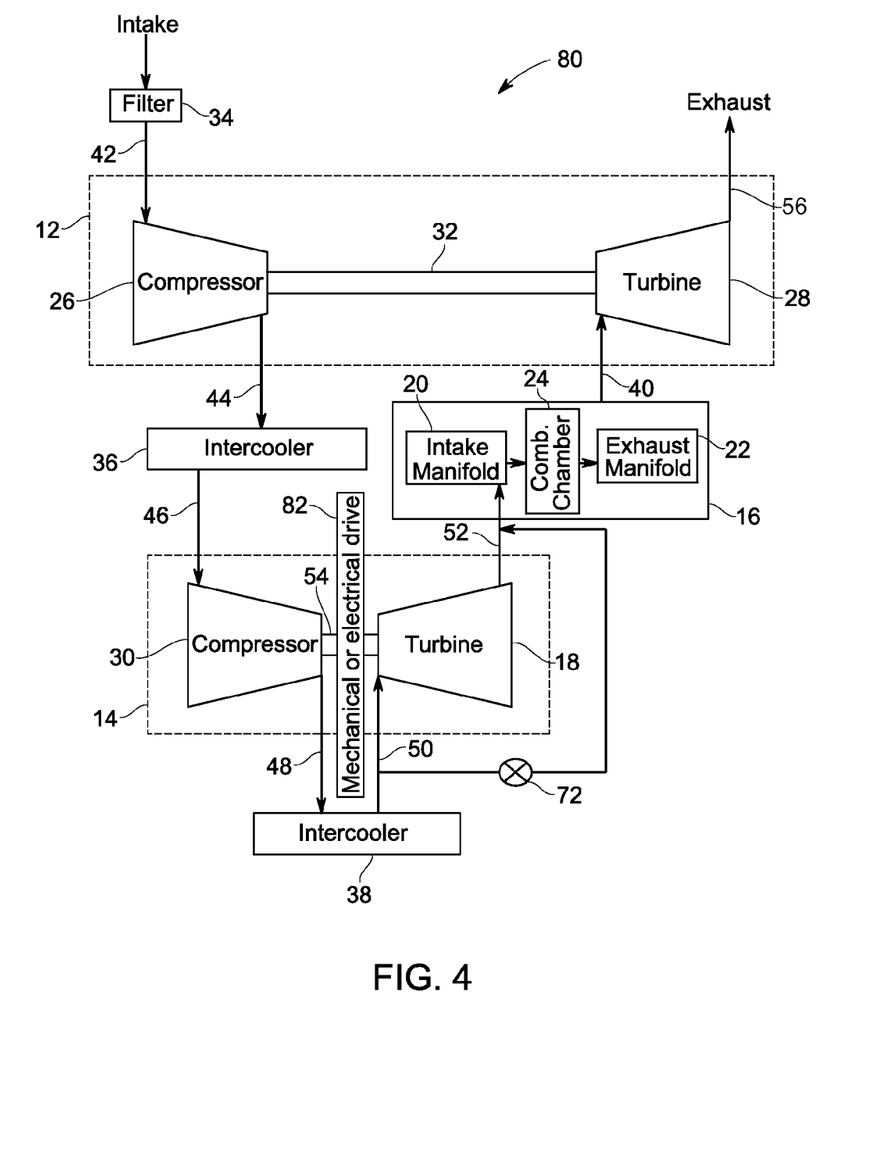
FIG. 4 is a diagrammatical representation of a power unit having an engine configured to include turbo-refrigeration for operation under high load conditions in accordance with an exemplary embodiment.

Referring now to FIG. 4, illustrated is an embodiment of a power unit 80, generally similar to power unit 70 of FIG. 3, wherein a bypass valve 72 for variable air flow/MAT is configured as an air flow bypass and in fluidic communication with the cooled compressed air stream 50 and the expanded air stream 52. In addition, power unit 80, and more particularly the second stage turbocharger 14, includes a drive unit 84 disposed in operable configuration with the compressor 30 and turbine 18. Similar to the previous embodiment, the inclusion of the bypass valve 72 enables the control of any surge of first stage turbocharger 12. During operation of power unit 70, the bypass valve 72 may be opened to increase air flow during transient acceleration. In addition, the drive unit 84 can be used to precisely control the speed of the second turbocharger, thereby enabling better control over the intake pressure and temperature. This drive unit may be electrically driven (e.g., by an electric motor) or mechanically driven, for example. It should be apparent to one skilled in the art that other means of driving the turbocharger may be employed, including, but not limited to, hydraulic or pneumatic means.

Figure 5:
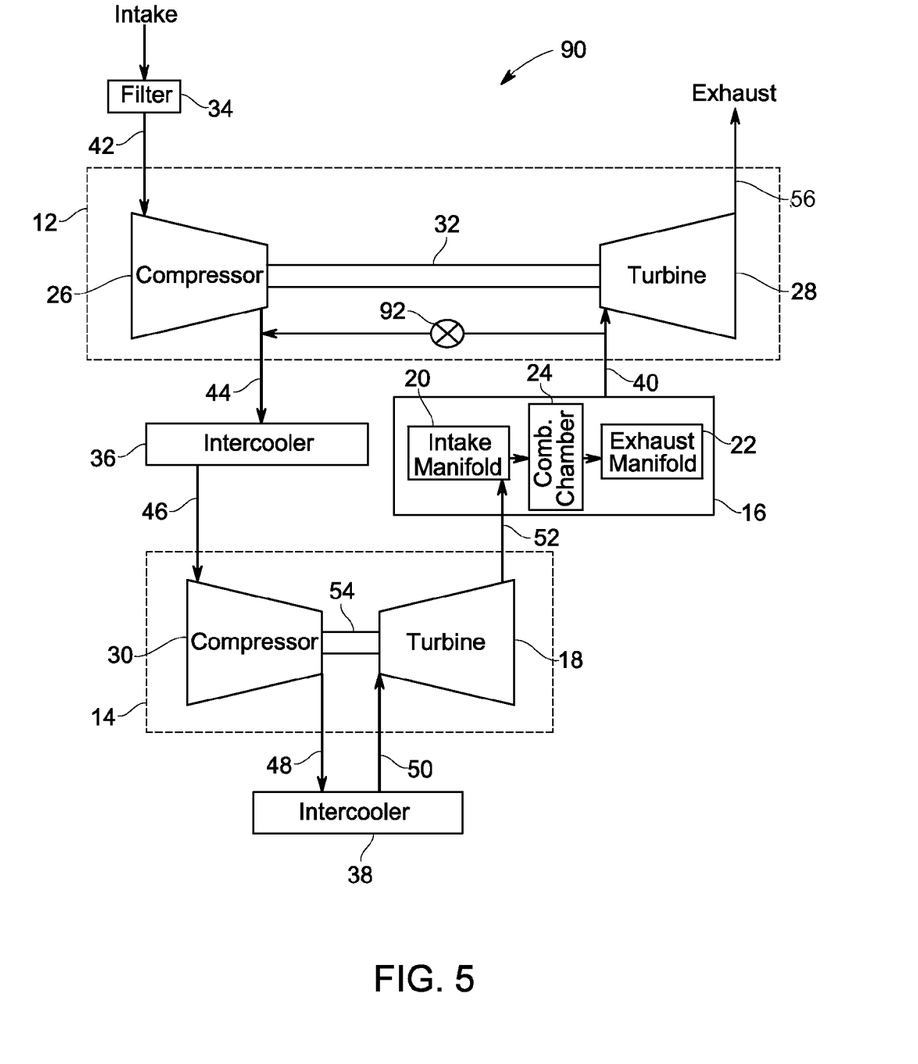
FIG. 5 is a diagrammatical representation of a power unit having an engine configured to include turbo-refrigeration for operation under high load conditions in accordance with an exemplary embodiment.

Referring now to FIG. 5, illustrated is an embodiment of a power unit 90, generally similar to power unit 10 of FIG. 1, but further including a bypass valve 92 for improved emission control. More specifically, the bypass valve 92 is configured as an air flow bypass and in fluidic communication with the compressed air stream 44 and the exhaust gas stream 40. The bypass valve 92 provides cool or hot exhaust gas recirculation (EGR) and resultant emission control. During operation of power unit 90, the bypass valve 92 may be operable to provide recirculation of generated exhaust gases in exhaust gas stream 40 to reduce emissions. In an embodiment, the bypass valve 92 may be replaced by a pump in order to circulate and control the EGR flow.

Figure 6:
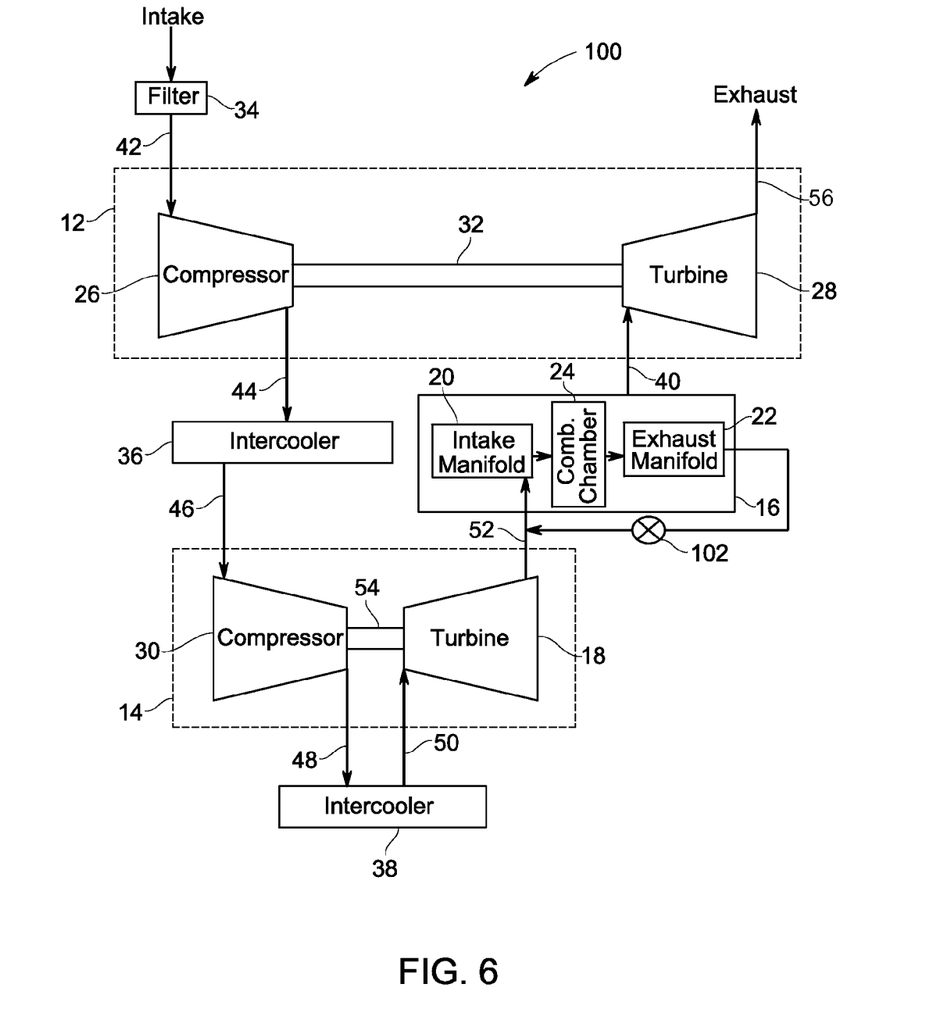
FIG. 6 is a diagrammatical representation of a power unit having an engine configured to include turbo-refrigeration for operation under high load conditions in accordance with an exemplary embodiment.

Referring to FIG. 6, illustrated is an embodiment of a power unit 100, generally similar to power unit 90 of FIG. 5, wherein a bypass valve 102 for improved emission control is configured as an air flow bypass and in fluidic communication with the exhaust manifold 22 of engine 16 and the expanded air stream 52. Bypass valve 102 provides cool or hot exhaust gas recirculation (EGR) and resultant emission control. During operation of power unit 100, the bypass valve 102 may be operable to provide recirculation of generated exhaust gases to reduce emissions. In an embodiment, the bypass valve 102 may be replaced by a pump in order to circulate and control the EGR flow.

Figure 7:
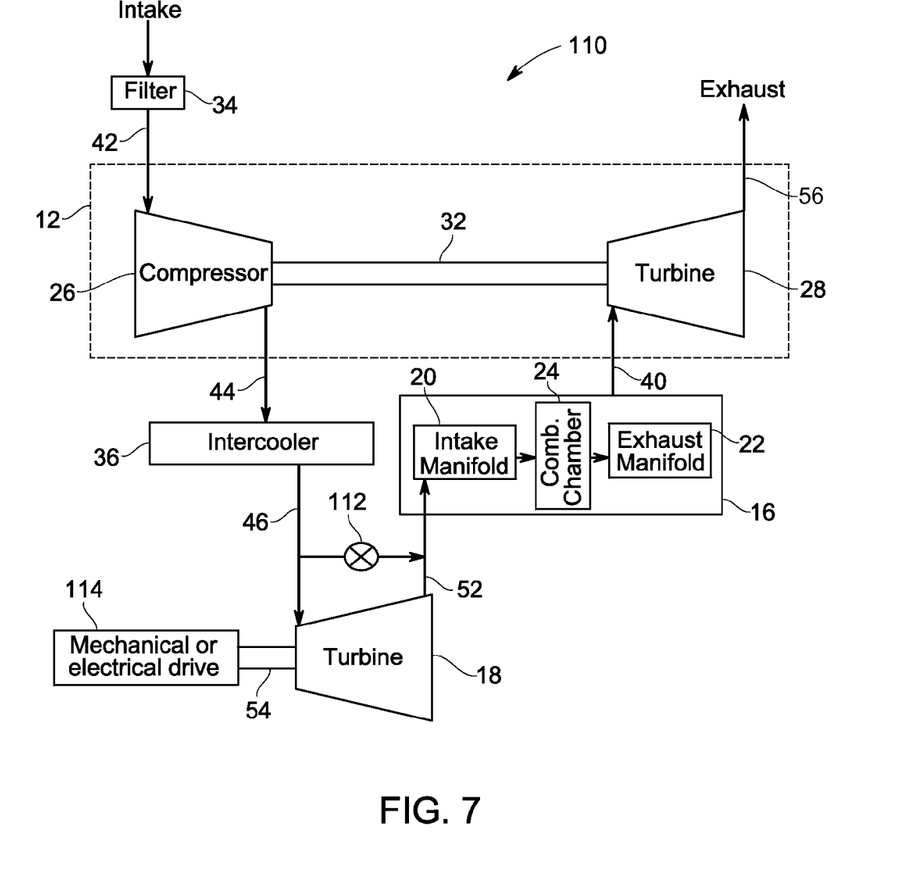
FIG. 7 is a diagrammatical representation of a power unit having an engine configured to include turbo-refrigeration for operation under high load conditions in accordance with an exemplary embodiment.

Illustrated in FIG. 7 is an embodiment of a power unit 110, generally similar to power unit 10 of FIG. 1, wherein a bypass valve 112 for variable air flow/MAT is configured as an air flow bypass and in fluidic communication with the cooled compressed air stream 46 and the expanded air stream 52. In addition, power unit 110 includes a drive unit 114 disposed in operable configuration with the turbine 18 via the shaft 54. In this particular embodiment, the compressor 30 has been eliminated and thus intercooler 36 is in direct fluidic communication with the turbine 18. Similar to the previous embodiments, the inclusion of the bypass valve 112 enables the control of any surge of first stage turbocharger 12. During operation of power unit 110, the bypass valve 112 may be opened to increase air flow during transient acceleration. In addition, the drive unit 114 can be used to precisely control the speed of the second turbocharger, thereby enabling better control over the intake pressure and temperature. This drive unit may be electrically driven (e.g., by an electric motor) or mechanically driven, for example. It should be apparent to one skilled in the art that other means of driving the turbocharger may be employed, including, but not limited to, hydraulic or pneumatic means.

Figure 8:
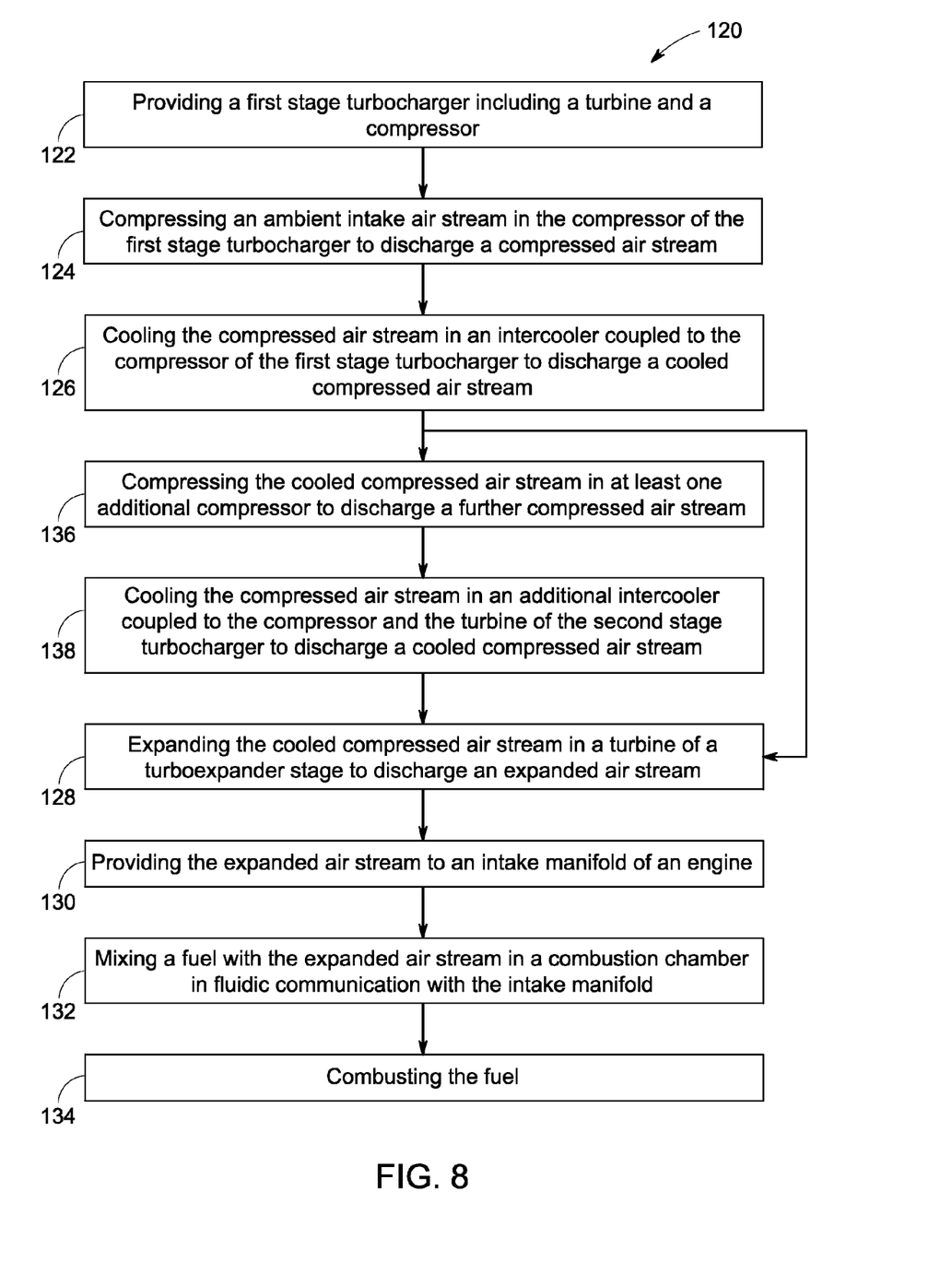
FIG. 8 is a schematic block diagram of method according to an exemplary embodiment.

FIG. 8 is a schematic logic flow diagram 120 illustrating a method according to an exemplary embodiment. Generally, the method involves providing a first stage turbocharger including a turbine and a compressor, the turbine configured to receive an exhaust from an exhaust manifold of an engine and provide extracted energy via a turbocharger shaft to a compressor, at step 122. Next, in step 124 an ambient intake air stream is compressed in the compressor of the first stage turbocharger to discharge a compressed air stream. In step 126, the compressed air stream is cooled in an intercooler coupled to the compressor of the first stage turbocharger to discharge a cooled compressed air stream. In step 128, the cooled compressed air stream is expanded in a turbine of a turboexpander stage to discharge an expanded air stream. The expanded air stream is cooled in the turbine of the turboexpander stage to a temperature of less than the ambient intake air stream. In step 130, the expanded air stream is provided to an intake manifold of an engine. In step 132, a fuel is mixed with the expanded air stream in a combustion chamber in fluidic communication with the intake manifold. In step 134, the fuel is combusted. In an alternate embodiment, additional steps may be included. More specifically, at a step 136, the cooled compressed air stream is compressed in at least one additional compressor to discharge a further compressed air stream, wherein the at least one compressor is coupled to the turbine of the turbocharger to form a second stage turbocharger. In step 138, the further compressed air stream is then cooled in an additional intercooler coupled to the compressor and the turbine of the second stage turbocharger to discharge a cooled compressed air stream.

The turbocharged power unit as disclosed herein provides cooling of the engine intake air through turborefrigeration, and without the need for additional refrigerant. Cooling of the engine air intake, in combination with adjusting the combustion event through spark timing or injection timing, provides for desired reduction in NOx emission, knock margin and turbocharger surge margin. The turbocharged power unit as disclosed herein may additionally provide knock control at high loads in premixed engines or dual fuel engines. Typically in premixed engines (spark-ignited engines or compression-ignited engines) as the engine increases in power, it is normally more prone to autoignition or knock. The turbocharged power unit and method of operation as described herein provides that as the engine increases in power, the intake manifold temperature will decrease, resulting in reduced autoignition or knock. In addition, the power unit provides improved power density of the engine by routing all of the air to the engine, thereby minimizing waste.

Accordingly, disclosed is a turbocharged power unit embodying technology for premixed combustion strategies such as high-efficiency dual fuels. Through the use of turborefrigeration in conjunction with premixed combustion strategies, the range of speeds and loads under which an engine can operate in a premixed mode are increased. The incorporation of a turbine expander to an intake manifold of an engine and providing an air intake stream into the intake manifold at a temperature less than the ambient intake temperature, allows for an engine that is operable under high load conditions and the minimizing of exhaust emissions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A turbocharged power unit, comprising:
   a first stage turbocharger including a turbine coupled via a turbocharger shaft to a compressor, the compressor configured to receive an ambient intake air stream and discharge a compressed air stream;
   an intercooler coupled to an output of the compressor of the first stage turbocharger, the intercooler configured to receive the compressed air stream from the compressor of the first stage turbocharger and discharge a cooled compressed air stream;
   a second stage turbocharger including a turbine and a compressor coupled to the turbine via a turbocharger shaft, the compressor configured to receive the cooled compressed air stream from the intercooler and discharge a further compressed air stream and wherein the turbine is in fluidic communication with the further compressed air stream from the compressor of the second stage turbocharger and configured to discharge an expanded air stream;
   an engine including an intake manifold, a combustion chamber and an exhaust manifold, wherein the intake manifold is coupled to the turbine of the second stage turbocharger to receive therefrom the expanded air stream and wherein the combustion chamber is in fluidic communication with the intake manifold and the exhaust manifold; and
   a bypass valve coupled to an electronic logic control unit and configured in fluidic communication with one of:
      the exhaust manifold and the compressed air stream discharged by the compressor of the first stage turbocharger, the bypass valve operable to provide exhaust gas recirculation via the second stage turbocharger, or
      the intake manifold and a compressed air stream discharged from a compressor of the second stage turbocharger so as to bypass the turbine of the second stage turbocharger, the bypass valve operable to provide an air flow bypass therebetween,
   wherein the turbine of the second stage turbocharger is configured to provide an expansion of the cooled compressed air stream to form the expanded air stream having a temperature of less than the ambient intake air stream.

2. The turbocharged power unit of claim 1, wherein the combustion chamber is operated in a premixed combustion mode.

3. The turbocharged power unit of claim 1, further including at least one additional intercooler, configured to receive the further compressed air stream discharged by the compressor of the second stage turbocharger and discharge a cooled compressed air stream to the turbine of the second stage turbocharger.

4. The turbocharged power unit of claim 3, wherein the bypass valve is configured in fluidic communication with the cooled compressed air stream discharged by the additional intercooler and the expanded air stream discharged from the turbine of the second stage turbocharger.

5. The turbocharged power unit of claim 4, further including a drive unit coupled to the second stage turbocharger.

6. The turbocharged power unit of claim 1, wherein the bypass valve is configured in fluidic communication with the exhaust gases discharged by the engine and the compressed air stream discharged by the compressor of the first stage turbocharger.

7. The turbocharged power unit of claim 1, wherein the engine comprises a compression-ignition engine.

8. The turbocharged power unit of claim 1, wherein the engine comprises a spark engine.

9. The turbocharged power unit of claim 1, wherein the engine is a dual fuel engine.

10. A turbocharged power unit, comprising:
    a first stage turbocharger including a turbine coupled via a turbocharger shaft to a compressor, the compressor configured to receive an ambient intake air stream and discharge a compressed air stream;
    a first intercooler coupled to an output of the compressor of the first stage turbocharger, the first intercooler configured to receive the compressed air stream from the compressor of the first stage turbocharger and discharge a cooled compressed air stream;
    a second stage turbocharger including a turbine coupled via a turbocharger shaft to a compressor, wherein the compressor is coupled to an output of the first intercooler and configured to receive the cooled compressed air stream from the first intercooler and discharge a compressed air stream;
    a second intercooler, coupled to an output of the compressor of the second stage turbocharger, the second intercooler configured to receive the compressed air stream from the compressor of the second stage turbocharger and discharge a cooled compressed air stream to the turbine of the second stage turbocharger;
    an engine including an intake manifold, wherein the intake manifold is coupled to the turbine of the second stage turbocharger to receive therefrom an expanded air stream; and
    a bypass valve coupled to an electronic logic control unit and configured in fluidic communication with one of:
       the exhaust manifold and the compressed air stream discharged by the compressor of the first stage turbocharger and operable to provide exhaust gas recirculation via the second stage turbocharger, or
       the intake manifold and the cooled compressed air stream discharged from the second intercooler and so as to bypass the turbine of the second stage turbocharger and operable to provide an air flow bypass therebetween,
    wherein the turbine of the second stage turbocharger is configured to provide an expansion of the input cooled compressed air stream discharged from the second intercooler to form the expanded air stream having a temperature of less than the ambient intake air stream.

11. The turbocharged power unit of claim 10, wherein the bypass valve is in fluidic communication with the cooled compressed air stream discharged from the second intercooler and the expanded air stream discharged from the turbine.

12. The turbocharged power unit of claim 10, wherein the bypass valve is configured in fluidic communication with the exhaust gases discharged by the engine and the compressed air stream discharged by the compressor of the first stage turbocharger.

13. A method of operating a turbocharged power unit comprising:

providing a first stage turbocharger including a turbine and a compressor, the turbine configured to receive an exhaust from an exhaust manifold of an engine and provide extracted energy via a turbocharger shaft to a compressor;

compressing an ambient intake air stream in the compressor of the first stage turbocharger to discharge a compressed air stream;

cooling the compressed air stream in an intercooler coupled to the compressor of the first stage turbocharger to discharge a cooled compressed air stream;

cooling the cooled compressed air stream in a compressor and at least one additional intercooler of a second stage turbocharger coupled to the intercooler to discharge a further cooled compressed air stream;

expanding the cooled compressed air stream from the at least one additional intercooler in a turbine of the second stage turbocharger to discharge an expanded air stream;

providing a bypass valve coupled to an electronic logic control unit and configured in fluidic communication with one of:

an exhaust manifold of an engine and the compressed air stream discharged by the compressor of the first stage turbocharger, the bypass valve operable to provide exhaust gas recirculation via the second stage turbocharger, or an intake manifold of the engine and a compressed air stream discharged from the compressor of the second stage turbocharger so as to bypass the turbine of the second stage turbocharger, the bypass valve operable to provide an air flow bypass therebetween, providing one of the compressed air stream discharged from the compressor of the second stage turbocharger, or the expanded air stream to the intake manifold of the engine;

mixing a fuel with the received air stream in a combustion chamber in fluidic communication with the intake manifold; and combusting the fuel, wherein the expanded air stream is cooled in the turbine of the second stage turbocharger to a temperature of less than the ambient intake air stream.

14. The method of claim 13, wherein the engine comprises a compression-ignition engine.

15. The method of claim 13, wherein the engine comprises a spark engine.

* * * * *